March 18, 1958   E. E. LIBMAN ET AL   2,826,915
FLOW METER
Filed Jan. 18, 1954
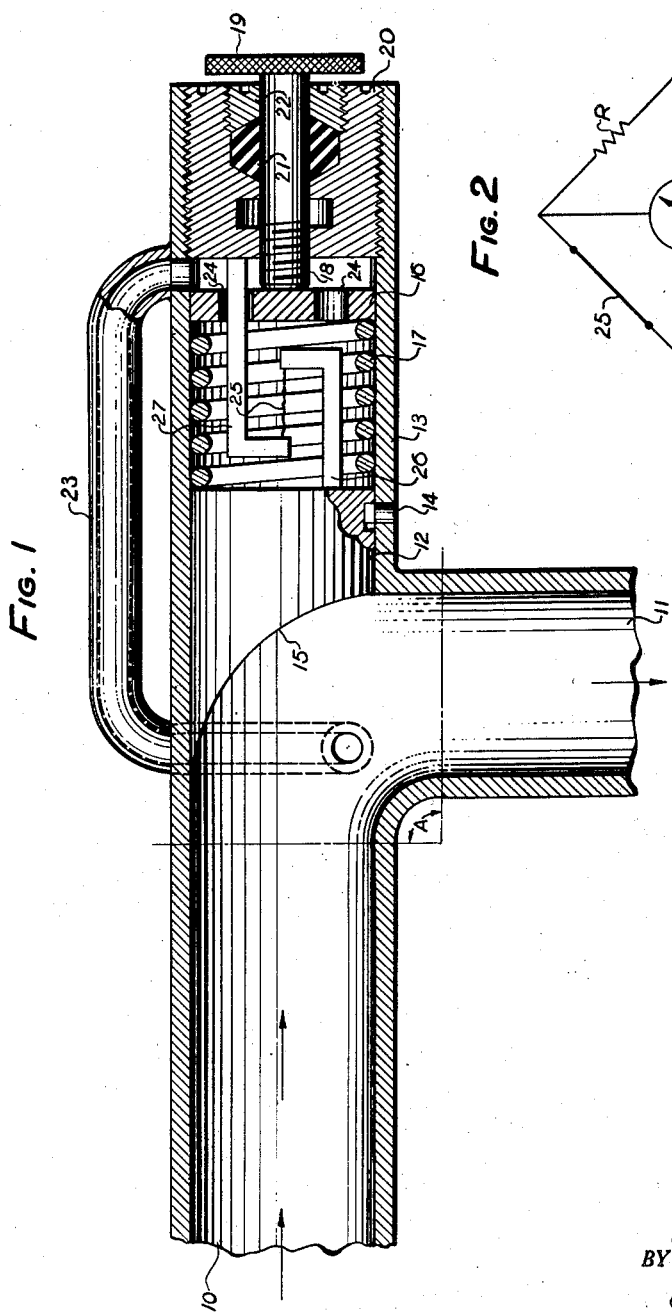
INVENTOR.
WILLIAM WOCKENFUSS
BY EARL E. LIBMAN
ATTORNEY

2,826,915
FLOW METER

Earl E. Libman, Catskill, and William Wockenfuss, Brooklyn, N. Y., assignors to Control Instrument Company, Inc., Brooklyn, N. Y., a corporation of New York Application January 18, 1954, Serial No. 404,637

3 Claims. (Cl. 73—228)

This invention relates to flow meters, and it is concerned particularly with improvements for enabling rates of flow to be measured in terms of weight rather than volume.

Flow meters customarily are designed to measure the volumetric rate at which a fluid is flowing. In some of the modern applications of flow meters it is more desirable that the rate of flow be measured in units of weight. For example, in the operation of jet aircraft it is more important to know the weight of fuel being consumed per unit of time than to know how many gallons are being consumed per unit of time. Conventional measuring methods are such that the consumption of fuel by weight must be computed from its consumption by gallons or other units of volume, which is inconvenient.

One of the principal objects of our invention is to provide an improved flow meter which directly measures rates of flow according to weight.

Another object of our invention is the provision of an improved flow meter which is capable of being placed directly into the passage through which the fluid flows without constricting or affecting its rate of flow.

Still another object of our invention is to provide a flow meter which employs an element of high sensitivity and one which will respond accurately to pressures exerted by the fluid as it passes through the flow meter.

A further object of the invention is the provision of a flow meter which is simple in design and one having indicating means readily settable to correspond with the fluids being used.

Other objects of the invention will be pointed out in the following description and claims and illustrated in the accompanying drawings, which disclose, by way of examples, the principle of the invention and the best mode, which has been contemplated of applying that principle.

In the drawings:

Fig. 1 is a sectional view of a flow meter constructed in accordance with the principles of the invention.

Fig. 2 is a circuit diagram of a highly sensitive strain gauge which is incorporated in the apparatus to operate the indicating means.

The flow meter of the present invention comprises a fluid inlet 10 to which a fluid outlet 11 is connected so as to form a fluid passage and a bend in the passage. In the disclosed embodiment the bend is formed by connecting the inlet 10 and the outlet 11 at an angle normal to each other. A fluid passing around the bend will undergo a change in direction of its velocity and as a result create changes in its vector momentum.

Positioned in the passage formed by the inlet 10 and the outlet 11 and at the connection of the same is a movable piston 12. The piston 12 is housed in housing 13 and is limited in rotation and axial movement by the pin 14. In the embodiment shown in the drawings housing 13 can be formed as an extension of the inlet 10. The piston 12 is provided with a curved surface 15 so that when it is in proper position as shown in Fig. 1 it will complete the bend of the connected inlet 10 and outlet 11 to divert the fluid from the inlet to the outlet. Diversion at the connection by the piston 12, of the fluid passing therethrough, will also, as a part of the connection, create changes in the momentum of the fluid. Since the piston 12 is permitted axial movement by the pin 14, it will be moved by the changes in momentum which the fluid undergoes as it flows around the bend.

In order to retain the piston in proper position, but at the same time permit it to move axially, an adjustable yieldable arrangement is provided. Also guided in housing 13 in back of piston 12 and between the piston and pressure plate 16 is the spring 17. Adjusting screw 18 and attached thumb piece 19 facilitate easy tension adjustment of the spring 17. At the rear or back end of housing 13 is a closure member 20 which, for ease of assembly, is screw threaded into the housing. In the embodiment as shown the adjusting screw 18 is guidingly supported by the closure member 20 and the area thereabout is made fluid tight by a seal ring 21 held in place by plug 22.

To aid the operation of the spring 17 and to prevent the generation of spurious results due to static pressure conditions, the inlet port of a conduit 23 is positioned normal to the flow of fluid in the passage in the area in which inlet 10 and outlet 11 are connected. This area of connection of inlet 10 and outlet 11 will fall within the dot-dash lines which define the angle A. The other end or outlet port of the conduit 23 is positioned to have its outlet opening behind the piston 12. Openings 24 in the plate 16 allow the fluid to pass therethrough so that changes in static pressure are communicated to the back of the piston 12.

The piston 12, forming a part of the bend is therefore movable in response to the changes in momentum of the fluid. The movement of the piston 12 reacts on a strain member 25 attached at one end to the leg of the L-shaped member 26 and at its other end to a similar member 27. Strain member 25 is suspended tautly between the legs of the L-shaped members 26 and 27 when the same are attached to their respective supports, piston 12 and closure 20.

Shown in Fig. 2 is the electrical arrangement utilized to indiacte the flow of fluid through the meter. Indicator 28 is operated by the changes in resistance in the strain member 25 which is formed as an arm of the Wheatstone bridge arrangement. Variable resistor 29 and resistors R complete the Wheatstone bridge. By proper adjustment of spring 17 and setting of the variable resistor 29 the zero setting of the indicator 28 can be controlled to read zero at zero flow. The indicator may then be calibrated to show the consumption of the fluid in weight per unit of time by the rate of flow.

The flow meter is easily set-up for operation. At zero flow, the spring 17 and variable resistor 29 are adjusted so that indicator 28 will read zero consumption. When the fluid is introduced into the meter through inlet 10, as it encounters the bend formed in the passage by the connection with outlet 11 and surface 15 of piston 12, it undegroes changes in its vector momentum. The changes in momentum tend to move the piston 12 rearwardly and out of the path of the fluid. As a consequence of the movement of the piston 12, strain member 25 will be tensioned or strained to result in a variation in its resistance and an unbalancing of the Wheatstone bridge. When the Wheatstone bridge is unbalanced indicator 28 will give a true reading of the flow of fluid through the meter in weight per unit of time.

Throughout the description the inlet 10 and the outlet 11 have been described as being "connected." It is not intended that the term "connected" be used in its strict sense, but more nearly to show that both the inlet 10 and the outlet 11 form a continuous fluid passage. Although they may be separate members joined together in some well known manner, it is also possible that they may both be indivisible portions of a bent pipe with the housing 13 attached to or cast integral with the same. In such case the term "connected" would be descriptive only of the area generally designated by the angle A.

It is apparent from the foregoing that the present device is quite simple to set up for operation, and that once it is set up properly, it will be consistently accurate. Moreover, because of the ability to pre-set the indicator 28, the meter may be employed to measure the rate of flow of any type of fluid. While the invention has been described with particular reference to aircraft operation, this should not be regarded as limiting the invention in any way. It is obvious that the invention will have utility wherever it is desired to measure the rate at which a fluid is flowing in terms of weight per unit of time. Moreover, it should be noted that the term "fluid" is not restricted to liquids only.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. A flow meter comprising a substantially T-shaped housing having two aligned branches and a third branch perpendicularly related thereto, one of said aligned branches and said third branch affording inlet and outlet passages for fluid, a movable member slidably guided in the second of said aligned branches of said housing and arranged to move in response to the change in momentum of fluid flowing from said inlet passage to said outlet passage, a conduit interconnecting said first branch with said second branch to neutralize static pressures, resilient means tending to oppose the movement of said movable member, and an electrical strain gauge coupled to said movable member and to said second aligned branch of said housing to detect displacement of said movable member.

2. A flow meter comprising a substantially T-shaped housing having two aligned branches and a third branch perpendicularly related thereto, one of said aligned branches and said third branch affording inlet and outlet passages for fluid, a deflecting member slidably guided in the second of said aligned branches for deflecting the flow of fluid from said inlet passage to said outlet passage, said deflecting means being arranged to move in said second branch in response to the change in the momentum of the fluid as the fluid flow is deflected, means in said second branch for yieldingly opposing the movement of said deflecting member, a conduit interconnecting said first branch with said second branch on opposite sides of said deflecting member to neutralize static pressure, a strain member in said second branch coupled between said deflecting member and a fixed position in said second branch to detect displacement of said deflecting member and electrical bridge means coupled to said strain member to detect changes in the electrical characteristics of said strain member.

3. A flow meter comprising a substantially T-shaped housing having two aligned branches and a third branch perpendicularly related thereto, one of said aligned branches and said third branch affording inlet and outlet passages for fluid, a piston slidably guided in the second of said aligned branches having a curved front surface for deflecting the flow of fluid from said inlet passage to said outlet passage, said piston being arranged to slide in said second branch in response to the change in the momentum of the fluid as the fluid flow is deflected, spring tension means in said second branch for yieldably opposing said movement of said piston, a conduit communicating at its ends with the interior of said housing on opposite sides of said piston for equalizing static pressure, a supporting member extending rearwardly from the back of said piston, a strain member having one end connected to the extremity of said supporting member and its other end attached to a fixed position in said second branch so that movement of said piston strains said strain member in accordance with the momentum of the fluid flow, said strain member having a resistance to the flow of electric current which varies in accordance with the strain on said member, and electrical bridge means coupled to said strained member to detect changes in the resistance thereof.

References Cited in the file of this patent

UNITED STATES PATENTS

| 1,401,299 | Wohlenberg | Dec. 27, 1921 |
| 1,479,663 | Herz | Jan. 1, 1924 |
| 2,442,938 | Ruge | June 8, 1948 |
| 2,538,785 | Karig | Jan. 23, 1951 |
| 2,605,638 | Pearson | Aug. 5, 1952 |
| 2,683,369 | Brewer | July 13, 1954 |